United States Patent [19]

Matsumoto

[11] Patent Number: 5,309,427

[45] Date of Patent: May 3, 1994

[54] OVERWRITE-CAPABLE MAGNETOOPTICAL RECORDING MEDIUM ALLOWING ENLARGED MARGIN OF HIGH LEVEL BEAM INTENSITY

[75] Inventor: Hiroyuki Matsumoto, Tokyo, Japan

[73] Assignee: Nikon Corporation, Tokyo, Japan

[21] Appl. No.: 757,061

[22] Filed: Sep. 9, 1991

[30] Foreign Application Priority Data

Sep. 13, 1990 [JP] Japan .................. 2-243339

[51] Int. Cl.[5] .......................... G11B 7/24; G11B 13/04
[52] U.S. Cl. ................... 369/275.2; 369/13; 369/288; 360/59
[58] Field of Search ............. 369/13, 275.1–275.4, 369/284, 286, 288; 360/59, 114

[56] References Cited

U.S. PATENT DOCUMENTS

| | | | |
|---|---|---|---|
| 4,466,035 | 8/1984 | Connell et al. | 360/114 |
| 4,586,092 | 4/1986 | Martens et al. | 369/13 |
| 4,658,388 | 4/1987 | Ishiwatari et al. | 369/13 |
| 5,018,119 | 5/1991 | Aratani et al. | 369/13 |

FOREIGN PATENT DOCUMENTS

| | | |
|---|---|---|
| 0191226 | 8/1986 | European Pat. Off. . |
| 0368194 | 5/1990 | European Pat. Off. . |
| 0382859 | 8/1990 | European Pat. Off. . |
| 0454858 | 11/1991 | European Pat. Off. . |
| 3619618A | 12/1986 | Fed. Rep. of Germany . |
| 59-171057 | 9/1984 | Japan . |
| 1-241051 | 9/1989 | Japan . |
| 1-298545 | 12/1989 | Japan . |
| WO90/02400 | 3/1990 | PCT Int'l Appl. . |

OTHER PUBLICATIONS

"The Bell System Technical Journal", vol. 62, (1983), pp. 1923–1936.

Primary Examiner—Hoa T. Nguyen
Attorney, Agent, or Firm—Shapiro and Shapiro

[57] ABSTRACT

A medium comprises a first layer consisting of perpendicularly magnetizable magnetic film functioning as a memory layer, a second layer consisting of perpendicularly magnetizable magnetic film functioning as a writing layer, if necessary, a third layer as a switching layer, and a fourth layer consisting of perpendicularly magnetizable magnetic film functioning as an initializing layer, the first to fourth layers being sequentially stacked, wherein the first and second layers are exchange-coupled, a direction of magnetization of only the second layer can be aligned in a predetermined direction without changing a direction of magnetization of the first layer at a room temperature, and the second and fourth layers are exchange-coupled at a temperature equal to or lower than a Curie temperature of the third layer. The medium of the present invention also comprises a thermal diffusion layer adjacent to the fourth layer.

10 Claims, 9 Drawing Sheets

FIG. 5
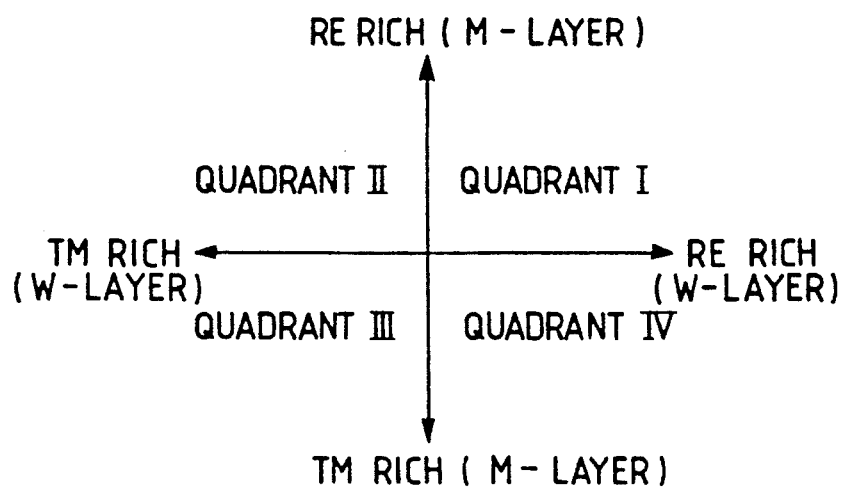
FIG. 6
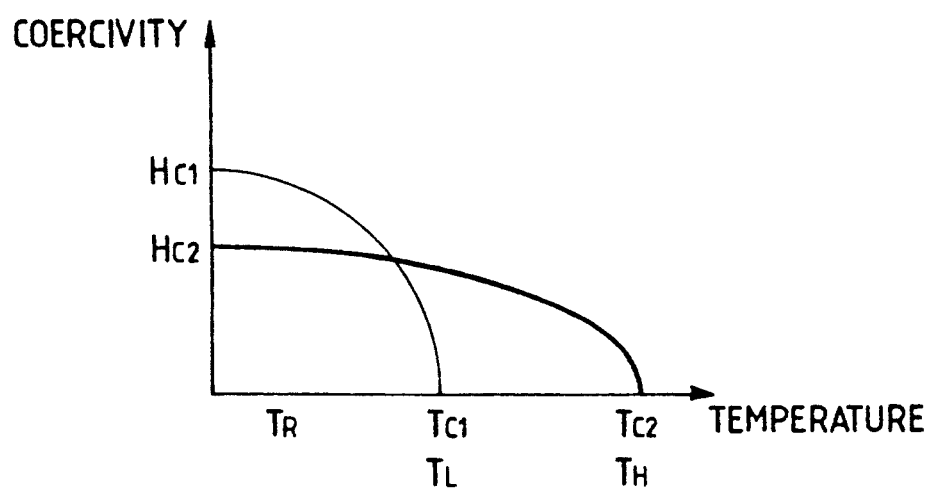
FIG. 7
| 1st LAYER (M) | ⇧⇩⇩⇧⇩⇧⇩⇩ * |
|---|---|
| 2nd LAYER (W) | ⇧⇧⇧⇧⇧⇧⇧⇧ |

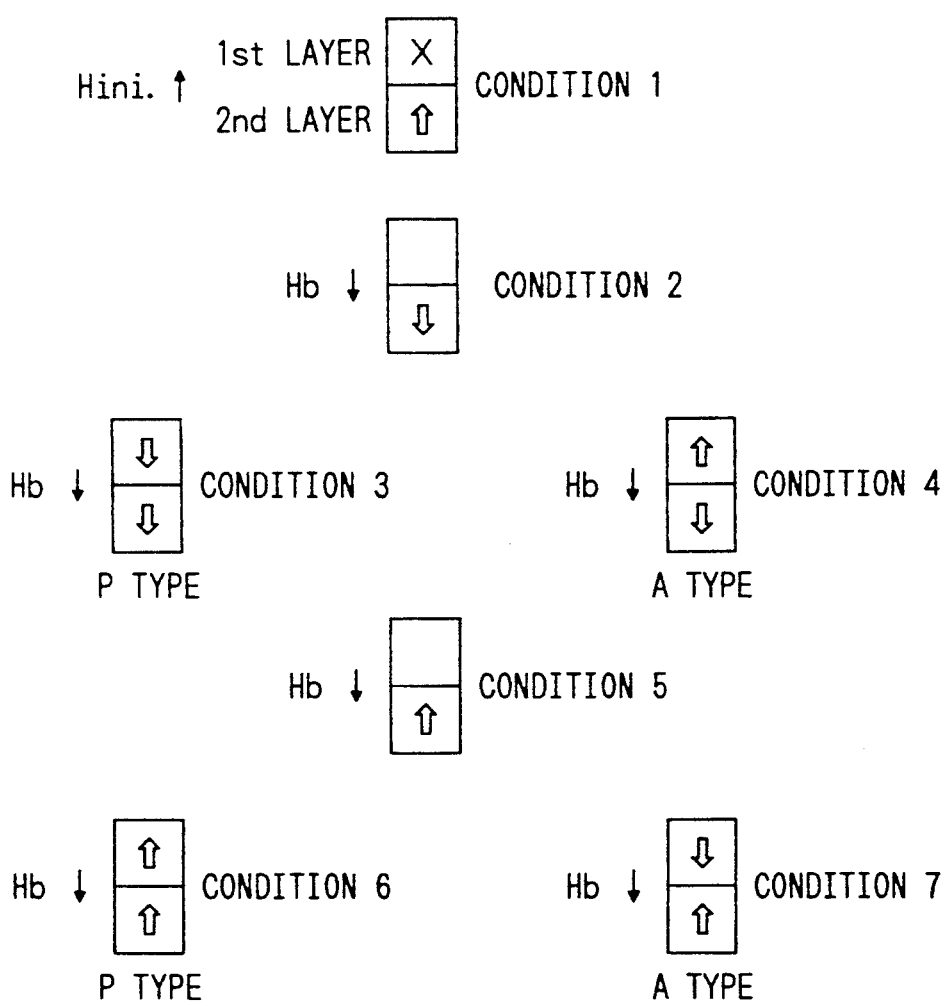

FIG. 10
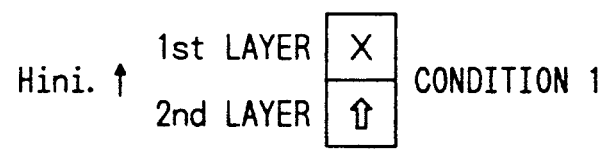
Hini. ↑  1st LAYER  X
         2nd LAYER  ⇑   CONDITION 1
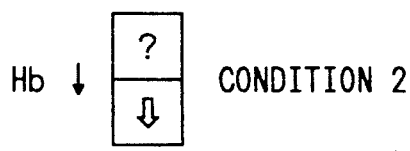
Hb ↓   ?
       ⇓   CONDITION 2
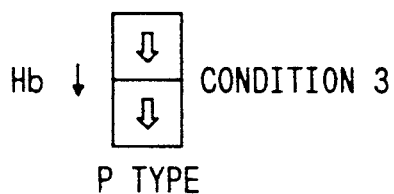
Hb ↓  ⇓
      ⇓   CONDITION 3
P TYPE
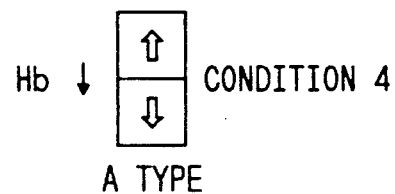
Hb ↓  ⇑
      ⇓   CONDITION 4
A TYPE
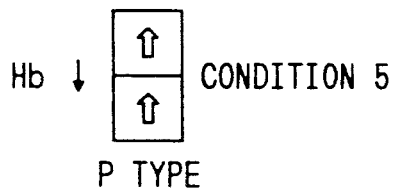
Hb ↓  ⇑
      ⇑   CONDITION 5
P TYPE
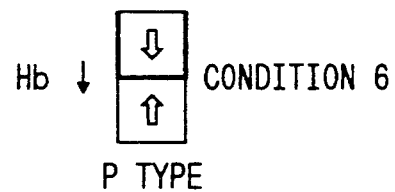
Hb ↓  ⇓
      ⇑   CONDITION 6
P TYPE
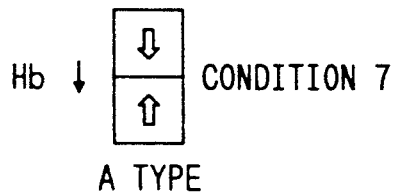
Hb ↓  ⇓
      ⇑   CONDITION 7
A TYPE
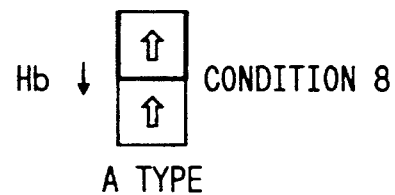
Hb ↓  ⇑
      ⇑   CONDITION 8
A TYPE
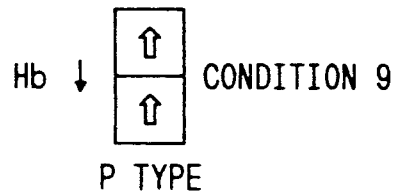
Hb ↓  ⇑
      ⇑   CONDITION 9
P TYPE
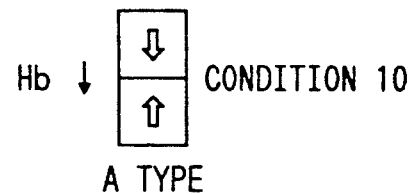
Hb ↓  ⇓
      ⇑   CONDITION 10
A TYPE FIG. 11
FIG. 12
(1A)  (1B) 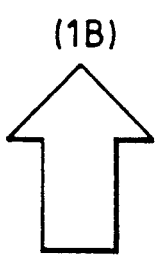  (2A) 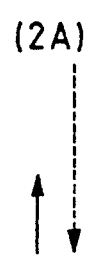 (2B) 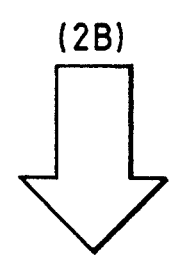
(3A)  (3B) 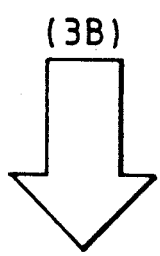  (4A)  (4B) 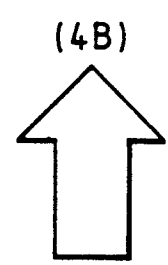

OVERWRITE-CAPABLE MAGNETOOPTICAL RECORDING MEDIUM ALLOWING ENLARGED MARGIN OF HIGH LEVEL BEAM INTENSITY

BACKGROUND OF THE INVENTION

1. Field of the Invention

The present invention relates to a magnetooptical recording medium capable of performing an overwrite operation by modulating only an intensity of a light beam in accordance with information to be recorded without modulating a direction and strength of a bias field Hb.

2. Related Background Art

In recent years, many efforts have been made to develop an optical recording/reproduction method which can satisfy various requirements including high density, large capacity, high access speed, and high recording-/reproduction speed, and a recording apparatus, a reproduction apparatus, and a recording medium used therefor.

Of various optical recording/reproduction methods, the magnetooptical recording/reproduction method is most attractive due to its unique advantages in that information can be erased after it is recorded, and new information can be repetitively recorded.

A recording medium used in the magnetooptical recording/reproduction method has a perpendicular magnetic layer or layers as a recording layer. The magnetic layer comprises, for example, amorphous GdFe or GdCo, GdFeCo, TbFe, TbCo, TbFeCo, and the like. Concentrical or spiral tracks are normally formed on the recording layer, and information is recorded on the tracks. In this specification, one of "upward" and "downward" directions of magnetization with respect to a film surface is defined as an "A direction", and the other one is defined as a "non-A direction". Information to be recorded is binary-coded in advance, and is recorded by two signals, i.e., a bit ($B_1$) having an "A-directed" magnetization, and a bit ($B_0$) having a "non-A-directed" magnetization. These bits $B_1$ and $B_0$ correspond to "1" and "0" levels of a digital signal. However, in general, the direction of magnetization of the recording tracks can be aligned in the "non-A direction" by applying a strong external field before recording. This "aligning process" is called "initialize*" in a conventional sense. Thereafter, a bit ($B_1$) having an "A-directed" magnetization is formed on the tracks. Information is expressed in accordance with the presence/absence and/or a bit length of the bit ($B_1$). Note that a bit is often called a mark recently.

Principle of Bit Formation

In the bit formation, a characteristic feature of laser, i.e., excellent coherence in space and time, is effectively used to focus a beam into a spot as small as the diffraction limit determined by the wavelength of the laser light. The focused light is irradiated onto the track surface to record information by producing bits less than 1 μm in diameter on the recording layer. In the optical recording, a recording density up to $10^8$ bits/cm$^2$ can be theoretically attained, since a laser beam can be concentrated into a spot with a size as small as its wavelength.

As shown in FIG. 3A, in the magnetooptical recording, a laser beam (L) is focused onto a recording layer (l) to heat it, while a bias field (Hb) is externally applied to the heated portion in the direction opposite to the initialized* direction. A coercivity $H_C$ of the locally heated portion is decreased below the bias field (Hb). As a result, the direction of magnetization of that portion is aligned in the direction of the bias field (Hb). In this way, reversely magnetized bits are formed.

Ferromagnetic and ferrimagnetic materials differ in the temperature dependencies of the magnetization and $H_C$. Ferromagnetic materials have $H_C$ which decreases around the Curie temperature and allow information recording based on this phenomenon. Thus, information recording in ferromagnetic materials is referred to as $T_C$ recording (Curie temperature recording).

On the other hand, ferrimagnetic materials have a compensation temperature $T_{comp}$, below the Curie temperature, at which magnetization (M) becomes zero. The $H_C$ abruptly increases around this temperature and hence abruptly decreases outside this temperature. The decreased $H_C$ is canceled by a relatively weak bias field Hb). Namely, recording is enabled. This process is called $T_{comp}$, recording (compensation point recording).

In this case, however, there is no need to adhere to the Curie point or temperatures therearound, and the compensation temperature. In other words, if a bias field (Hb) capable of canceling a decreased $H_C$ is applied to a magnetic material having the decreased $H_C$ at a predetermined temperature higher than a room temperature, recording is enabled.

Principle of Reproduction

FIG. 3B shows the principle of information reproduction based on the magnetooptical effect. Light is an electromagnetic wave with an electromagnetic-field vector normally emanating in all directions in a plane perpendicular to the light path. When light is converted to linearly polarized beams ($L_P$) and irradiated onto a recording layer (l), it is reflected by its surface or passes through the recording layer (l). At this time, the plane of polarization rotates according to the direction of magnetization (M). This phenomenon is called the magnetic Kerr effect or magnetic Faraday effect.

For example, if the plane of polarization of the reflected light rotates through $\theta_k$ degrees for the "A-directed" magnetization, it rotates through $-\theta_k$ degrees for the "non-A-directed" magnetization. Therefore, when the axis of an optical analyzer (polarizer) is set perpendicular to the plane inclined at $-\theta_k$, the light reflected by a "non-A-direction" magnetized bit ($B_0$) cannot pass through the analyzer. On the contrary, a component corresponding to a product of $(\sin 2\theta_k)^2$ and the light reflected by a bit ($B_1$) magnetized along the "A direction" passes through the analyzer and becomes incident on a detector photoelectric conversion means). As a result, the bit ($B_1$) magnetized along the "A direction" looks brighter than the bit ($B_0$) magnetized along the "non-A direction", and causes the detector to produce a stronger electrical signal. The electrical signal from the detector is modulated in accordance with the recorded information, thus reproducing the information.

In order to re-use a recorded medium, (i) the medium must be re-initialized* by an initialize* device, or (ii) an erase head having the same arrangement as a recording head must be added to a recording apparatus, or (iii) as preliminary processing, recorded information must be erased using a recording apparatus or an erasing apparatus.

Therefore, in the conventional magnetooptical recording method, it is impossible to perform an overwrite operation, which can properly record new information regardless of the presence/absence of recorded information.

If the direction of a bias field Hb can be desirably modulated between the "A-direction" and "non-A direction", an overwrite operation is possible. However, it is impossible to modulate the direction of the bias field Hb at high speed. For example, if the bias field Hb comprises a permanent magnet, the direction of the magnet must be mechanically reversed. However, it is impossible to reverse the direction of the magnet at high speed. Even when the bias field Hb comprises an electromagnet, it is also impossible to modulate the direction of a large-capacity current at high speed.

However, according to remarkable technical developments, a magnetooptical recording method capable of performing an overwrite operation by modulating only an intensity of a light beam to be irradiated in accordance with binary coded information to be recorded without modulating a strength (including an ON/OFF state) or the direction of the bias field Hb, an overwrite-capable magnetooptical recording medium used in this method, and an overwrite-capable recording apparatus used in this method were invented and filed as a patent application (Japanese Patent Laid-Open Application No. 62-175948 corresponding to DE 3,619,618 and to U.S. application Ser. No. 453,255). This invention will be quoted as the basic invention hereinafter.

[Description of the Basic Invention]

The basic invention uses an "overwrite-capable multilayered magnetooptical recording medium which includes a recording layer (to be referred to as a memory layer or M layer hereinafter in this specification) which comprises a perpendicularly magnetizable magnetic thin film, and a reference layer (to be referred to as a "writing layer" or W layer hereinafter in this specification) which comprises a perpendicularly magnetizable magnetic thin film, and in which the two layers are exchange-coupled, and the direction of magnetization of only the W layer can be aligned in a predetermined direction without changing the direction of magnetization of the M layer at a room temperature".

Information is expressed by a bit having an "A-directed" magnetization, and a bit having a "non-A-directed" magnetization in the M layer (in some cases, also in the W layer).

In this medium, the direction of magnetization of the W layer can be aligned in an "A direction" by an external means (e.g., an initial field Hini.). At this time, the direction of magnetization of the M layer is not reversed. Furthermore, the direction of magnetization of the W layer which has been aligned in the "A direction" is not reversed upon application of an exchange coupling force from the M layer. In contrast to this, the direction of magnetization of the M layer is not reversed upon application of an exchange coupling force from the W layer aligned in the "A direction".

The W layer has a lower coercivity $H_C$ and a higher Curie temperature $T_C$ than those of the M layer.

According to a recording method of the basic invention, only the direction of magnetization of the W layer of the recording medium is aligned in the "A direction" by an external means until a time immediately before recording. This process will be specially referred to as "initialize" in this specification. The "initialize" process is unique to an overwrite-capable medium.

Thereafter, a laser beam which is pulse-modulated in accordance with binary coded information is radiated on the medium. The laser beam intensity has high level $P_H$ and low level $P_L$. These high and low levels correspond to high and low levels of a pulse. Note that low level is higher than very low level* $P_R$ to be irradiated on the medium in a reproduction mode. Therefore, for example, an output waveform of a laser beam in the basic invention is as shown in FIG. 4A.

Although not described in the specification of the basic invention, a recording beam need not always be a single beam but may be two proximity beams in the basic invention. More specifically, a leading beam may be used as a low-level laser beam (erasing beam) which is not modulated in principle, and a trailing beam may be used as a high-level laser beam (writing beam) which is modulated in accordance with information. In this case, the trailing beam is pulse-modulated between high level and base level (equal to or lower than low level, and its output may be zero). In this case, an output waveform is as shown in FIG. 4B.

A bias field Hb whose direction and strength are not modulated is applied to a medium portion irradiated with the beam. The bias field Hb cannot be focused to a size as small as the portion irradiated with the beam (spot region), and a region where the bias field Hb is applied is considerably larger than the spot region.

When a low-level beam is irradiated, a bit in one of the "A direction" and the "non-A direction" is formed in the M layer regardless of the direction of magnetization of a previous bit.

When a high-level beam is radiated, a bit in the other direction is formed in the M layer regardless of the direction of magnetization of the previous bit.

Thus, the overwrite operation is completed.

In the basic invention, a laser beam is pulse-modulated according to information to be recorded. However, this procedure itself has been performed in the conventional magnetooptical recording method, and a means for pulse-modulating the beam intensity on the basis of binary coded information to be recorded is a known means. For example, see "THE BELL SYSTEM TECHNICAL JOURNAL", Vol. 62 (1983), pp. 1923-1936 for further details. Therefore, the modulating means is available by partially modifying the conventional beam modulating means if required high and low levels of the beam intensity are given. Such a modification would be easy for those who are skilled in the art if high and low levels of the beam intensity are given.

One characteristic feature of the basic invention lies in high and low levels of the beam intensity. More specifically, when the beam intensity is at high level, "A-directed" magnetization of the W layer is reversed to the "non-A direction" by an external means such as a bias field (Hb) and the like, and a bit having the "non-A-directed" [or "A-directed"] magnetization is thus formed in the M layer by means of the "non-A-directed" magnetization of the W layer. When the beam intensity is at low level, the direction of magnetization of the W layer is left unchanged from the initialized state, and a bit having the "A-directed" [or "non-A-directed"] magnetization is formed in the M layer under the influence of the W layer (this influence is exerted on the M layer through the exchange coupling force).

In this specification, if expressions ooo [or Δ] appear, ooo outside the parentheses in the first expression corresponds to ooo in the subsequent expressions ooo [or Δ] and vice versa.

A medium used in the basic invention is roughly classified into first and second categories. In either category, a recording medium has a multilayered structure including the M and W layers.

The M layer is a magnetic layer, which exhibits a high coercivity at a room temperature, and has a low magnetization reversing temperature. The W layer is a magnetic layer, which exhibits a relatively lower coercivity at a room temperature and has a higher magnetization reversing temperature than those of the M layer. Note that each of the M and W layers may comprise a multilayered structure. If necessary, a third layer (e.g., an adjusting layer for an exchange coupling force $\sigma_w$) may be interposed between the M and W layers. In addition, a clear boundary between the M and W layers need not be formed, and one layer can be gradually converted into the other layer.

In the first category, when the coercivity of the M layer is represented by $H_{C1}$; that of the W layer, $H_{C2}$; a Curie temperature of the M layer, $T_{C1}$; that of the W layer, $T_{C2}$; a room temperature, $T_R$; a temperature of the recording medium obtained when a laser beam at low level $P_L$ is radiated, $T_L$; that obtained when a laser beam at high level $P_H$ is irradiated, $T_H$; a coupling field applied to the M layer, $H_{D1}$; and a coupling field applied to the W layer, $H_{D2}$, the recording medium satisfies Formula 1 below, and satisfies Formulas 2 to 5 at the room temperature:

$$T_R < T_{C1} \approx T_L < T_{C2} \approx T_H \quad \text{Formula 1}$$

$$H_{C1} > H_{C2} + |H_{D1} \mp H_{D2}| \quad \text{Formula 2}$$

$$H_{C1} > H_{D1} \quad \text{Formula 3}$$

$$H_{C2} > H_{D2} \quad \text{Formula 4}$$

$$H_{C2} + H_{D2} < |H_{ini.}| < H_{C1} \pm H_{D1} \quad \text{Formula 5}$$

In the above formulas, symbol "$\approx$" means "equal to" or "substantially equal to ($\pm 20°$ C.)". In addition, of double signs ± and ∓, the upper sign corresponds to an A (antiparallel) type medium, and the lower sign corresponds to a P (parallel) type medium (these media will be described later). Note that a ferromagnetic medium belongs to a P type.

The relationship between a coercivity and a temperature is as shown in the graph of FIG. 6. In FIG. 6, a thin curve represents the characteristics of the M layer, and a bold curve represents those of the W layer.

Therefore, when an external means, e.g., an initial field (Hini.) is applied to this recording medium at the room temperature, the direction of magnetization of only the W layer is reversed without reversing that of the M layer according to Formula 5. When the external means exerts an influence (e.g., the initial field (Hini.)) on the medium before recording, only the direction of magnetization of the W layer can be aligned in the "A direction". That is, the "initialize" process is performed. In the following description, the "A direction" is indicated by an upward arrow ↑ in this specification, and the "non-A direction" is indicated by a downward arrow ↓ for the sake of simplicity. If the initial field Hini. becomes zero, the direction of magnetization ↑ of the W layer can be left unchanged without being re-reversed according to Formula 4.

FIG. 7 schematically shows a state wherein only the W layer is magnetized by the external means in the "A direction" ↑ until a time immediately before recording.

In FIG. 7, the direction of magnetization* in the M layer represents previously recorded information. In the following description, since the direction of magnetization of the M layer can be disregarded, it is simply indicated by X, as shown in CONDITION 1 in FIG. 7 or 8.

In CONDITION 1, a high-level laser beam is irradiated on the medium to increase a medium temperature to $T_B$. Since $T_H$ is higher than the Curie temperature $T_{C1}$, the magnetization of the M layer disappears. In addition, since $T_H$ is near the Curie temperature $T_{C2}$, the magnetization of the W layer also disappears completely or almost completely. The bias field Hb in the "A direction" or "non-A direction" is applied to the medium in accordance with a type of medium. The bias field Hb may be a stray field from the medium itself. For the sake of simplicity, assume that the bias field Hb in the "non-A direction" is applied to the medium. Since the medium is moving, a given irradiated portion is immediately separated apart from the laser beam, and is cooled. When the medium temperature is decreased under the presence of Hb, the direction of magnetization of the W layer is reversed to the "non-A direction" ↓ to follow Hb (CONDITION 2 in FIG. 8).

When the medium is further cooled and the medium temperature is decreased slightly below $T_{C1}$, magnetization of the M layer appears again. In this case, the direction of magnetization of the M layer is influenced by that of the W layer through a magnetic coupling (exchange coupling) force, and is aligned in a predetermined direction. As a result, a "non-A-directed" ↓ bit (the P type medium) or an "A-directed" ↑ bit (the A type medium) is formed according to the type of medium. This state corresponds to CONDITION 3 (P type) or 4 (A type) in FIG. 8.

A change in condition caused by the high-level laser beam will be called a high-temperature cycle herein.

A laser beam at low level $P_L$ is irradiated on the medium to increase the medium temperature to $T_L$. Since $T_L$ is near the Curie temperature $T_{C1}$, the magnetization of the M layer disappears completely or almost completely. However, since $T_L$ is lower than the Curie temperature $T_{C2}$, the magnetization of the W layer does not disappear. This state is represented by CONDITION 5 in FIG. 8. In this state, although the bias field Hb is unnecessary, it cannot be turned on or off at high speed (within a short period of time). Therefore, the bias field Hb in the high-temperature cycle is left applied inevitably.

However, since the $H_{C2}$ is kept high, the magnetization ↑ of the W layer will not be reversed by Hb. Since the medium is moving, a given irradiated portion is immediately separated apart from the laser beam, and is cooled. As cooling progresses, the magnetization of the M layer appears again. The direction of magnetization appearing in this case is influenced by the W layer through the magnetic coupling force, and is aligned in a predetermined direction. As a result, an "A-directed" ↑ bit (P type) or a "non-A-directed" ↓ bit (A type) is formed in the M layer according to the type of medium. This magnetization is left unchanged at the room temperature. This state corresponds to CONDITION 6 (P type) or 7 (A type) in FIG. 8.

A change in condition caused by the low-level laser beam will be called a low-temperature cycle herein.

As described above, "non-A-directed" ↓ and "A-directed" ↑ bits can be desirably formed by selecting the high- and low-temperature cycles independently of the direction of magnetization of the M layer before recording. More specifically, an overwrite operation is enabled by pulse-modulating the laser beam between high level (high-temperature cycle) and low level (low-temperature cycle) in accordance with information. Refer to FIGS. 9A and 9B. FIGS. 9A and 9B illustrate directions of magnetization of P and A type media at the room temperature or formed when the medium temperature is returned to the room temperature.

In the above description, both the first and W layers have no compensation temperature $T_{comp.}$ between the room temperature and the Curie temperature. However, when the compensation temperature $T_{comp.}$ is present, if the medium temperature exceeds it, ① the direction of magnetization is reversed (in practice, although the directions of sublattice magnetization of RE and TM atoms are not changed, since the relationship between their strengths is reversed, the direction of magnetization of the alloy is reversed), and ② A and P types are reversed. For these reasons, a description must be complicated accordingly. In this case, the direction of the bias field Hb is opposite to the direction ↓ in the above description at the room temperature. That is, Hb in the same direction as the "initialized" direction ↑ of magnetization of the W layer is applied.

A recording medium normally has a disk shape, and is rotated during recording. For this reason, a recorded portion (bit) is influenced again by an external means, e.g., Hini. after recording. As a result, the direction of magnetization of the W layer is aligned in the original "A direction" ↑. In other words, the W layer is "initialized". However, at the room temperature, the magnetization of the W layer can no longer influence that of the M layer, and the recorded information can be held.

If linearly polarized light is irradiated on the M layer, since light reflected thereby includes information, the information can be reproduced as in the conventional magnetooptical recording medium.

A perpendicular magnetic film constituting each of the M and W layers is selected from the group consisting of ① amorphous or crystalline ferromagnetic and ferrimagnetic materials having no compensation temperature and having a Curie temperature, and ② an amorphous or crystalline ferrimagnetic material having both the compensation temperature and the Curie temperature.

The first category which utilizes the Curie temperature as the magnetization reversing temperature has been described. In contrast to this, the second category utilizes $H_C$ decreased at a temperature lower than the Curie temperature. In the second category, substantially the same description as the first category can be applied except that a temperature $T_{S1}$ at which the M layer is magnetically coupled to the W layer is used in place of $T_{C1}$ in the first category, and a temperature $T_{S2}$ at which the direction of magnetization of the W layer is reversed by Hb is used in place of $T_{C2}$.

In the second category, when the coercivity of the M layer is represented by $H_{C1}$; that of the W layer, $H_{C2}$; a temperature at which the M layer is magnetically coupled to the W layer, $T_{S1}$; a temperature at which the magnetization of the W layer is reversed by Hb, $T_{S2}$; a room temperature, $T_R$; a medium temperature obtained when a laser beam at low level $P_L$ is irradiated, $T_L$; that obtained when a laser beam at high level $P_H$ is irradiated, $T_H$; a coupling field applied to the M layer, $H_{D1}$; and a coupling field applied to the W layer, $H_{D2}$, the recording medium satisfies Formula 6 below, and satisfies Formulas 7 to 10 at the room temperature:

$$T_R < T_{S1} \approx T_L < T_{S2} \approx T_H \qquad \text{Formula 6}$$

$$H_{C1} > H_{C2} + |H_{D1} \mp H_{D2}| \qquad \text{Formula 7}$$

$$H_{C1} > H_{D1} \qquad \text{Formula 8}$$

$$H_{C2} > H_{D2} \qquad \text{Formula 9}$$

$$H_{C2} + H_{D2} < |H_{ini.}| < H_{C1} \pm H_{D1} \qquad \text{Formula 10}$$

In the above formulas, of double signs ± and ∓, the upper sign corresponds to an A (antiparallel) type medium, and the lower sign corresponds to a P (parallel) type medium (these media will be described later).

In the second category, when the medium is at the high temperature $T_H$, the magnetization of the W layer does not disappear, but is sufficiently weak. The magnetization of the M layer disappears, or is sufficiently weak. Even if sufficiently weak magnetization is left in both the M and W layers, the bias field Hb ↓ is sufficiently large, and the Hb ↓ forces the direction of magnetization of the W layer and that of the M layer in some cases to follow that of the Hb ↓. This state corresponds to CONDITION 2 in FIG. 10.

Thereafter, the W layer influences the M layer via $\sigma_w$ ① immediately, or ② when cooling progresses after irradiation of the laser beam is stopped and the medium temperature is decreased below $T_H$, or ③ when the irradiated portion is away from Hb, thereby aligning the direction of magnetization of the M layer in a stable direction. As a result, CONDITION 3 (P type) or 4 (A type) in FIG. 10 is established.

On the other hand, when the medium is at the low temperature $T_L$, both the W and M layers do not lose their magnetization. However, the magnetization of the M layer is relatively weak. In this case, there are two bit states, i.e., CONDITIONs 5 and 6 in FIG. 10 for P type, and there are also two bit states, i.e., CONDITIONs 7 and 8 in FIG. 10 for A type. In CONDITIONs 6 and 8, a magnetic wall (indicated by a bold line) is generated between the M and W layers, and the medium is in a relatively unstable (metastable) condition. The medium portion in this condition is applied with Hb ↓ immediately before it reaches the irradiation position of the laser beam. Nevertheless, CONDITION 6 or 8 can be maintained. Because, since the W layer has sufficient magnetization at the room temperature, the direction of magnetization of the W layer will not be reversed by Hb ↓. The M layer in CONDITION 8, whose direction of magnetization is opposite to Hb ↓, receives the influence of the exchange coupling force $\rho_w$ larger than the influence of Hb ↓, and the direction of magnetization of the M layer is held in the same direction as that of the W layer since the medium is of P type.

Thereafter, the portion in CONDITION 6 or 8 is irradiated with a low-level laser beam. For this reason, the medium temperature is increased. Upon an increase in medium temperature, the coercivities of the two layers are decreased. However, since the W layer has a high Curie temperature, a decrease in coercivity $H_{C2}$ is small, and the "A direction" ↑ corresponding to the "initialized" direction of magnetization is maintained without being overcome with Hb ↓. On the other hand, since the medium temperature is lower than the Curie temperature $T_{C1}$ of the M layer although the M layer has the low Curie temperature, the coercivity $H_{C1}$ remains. However, since the coercivity $H_{C1}$ is small, the M layer receives ① the influence of Hb ↓ and ② the influence via the exchange coupling force $\sigma_w$ from the W layer (force for aligning the direction of magnetization of the M layer in the same direction as that of the W layer in P type). In this case, the latter influence is stronger than the former influence, and the following formulas are simultaneously satisfied:

$$H_{C1} + Hb < \frac{\sigma_w}{2M_{S1}t_1}$$

and $$H_{C2} + Hb > \frac{\sigma_w}{2M_{S2}t_2}$$

The lowest temperature at which these formulas are simultaneously satisfied will be called $T_{LS}$. In other words, the lowest temperature at which the magnetic wall in CONDITION 6 or 8 disappears is $T_{LS}$.

As a result, CONDITION 6 transits to CONDITION 9, and CONDITION 8 transits to CONDITION 10. On the other hand, CONDITION 5 originally having no magnetic wall is the same as CONDITION 9, and CONDITION 7 is the same as CONDITION 10. Consequently, a bit in CONDITION 9 (P type) or 10 (A type) is formed upon irradiation of the low-level beam regardless of the previous state (CONDITION 5 or 6 for P type, or CONDITION 7 or 8 for A type).

This state is maintained when the medium temperature is decreased to the room temperature after the laser beam irradiation is stopped or the bit falls outside the irradiation position. CONDITION 9 (P type) or 10 (A type) in FIG. 10 is the same as CONDITION 6 (P type) or 7 (A type) in FIG. 8.

As can be understood from the above description, the low-temperature cycle is executed without increasing the medium temperature up to the Curie temperature $T_{C1}$ of the M layer.

Even when the low-temperature cycle is executed at a temperature equal to or higher than $T_{C1}$, since the medium temperature is increased from the room temperature to $T_{C1}$ via $T_{LS}$, CONDITION 6 transits to CONDITION 9 for P type, and CONDITION 8 transits to CONDITION 10 for A type at that time. Thereafter, the medium temperature reaches $T_{C1}$, and CONDITION 5 shown in FIG. 8 is established.

In the above description, both the M and W layers have no compensation temperature $T_{comp.}$ between the room temperature and the Curie temperature. However, when the compensation temperature $T_{comp.}$ is present, if the medium temperature exceeds it, ① the direction of magnetization is reversed, and ② A and P types are reversed. For these reasons, a description must be complicated accordingly. In this case, the direction of the bias field Hb is opposite to the direction in the above description at the room temperature.

In both the first and second categories, the recording medium is preferably constituted by the M and W layers each of which comprises an amorphous ferrimagnetic material selected from transition metal (e.g., Fe, Co)-heavy rare earth metal (e.g., Gd, Tb, Dy, and the like) alloy compositions.

When the materials of both the M and W layers are selected from the transition metal-heavy rare earth metal alloy compositions, the direction and level of magnetization appearing outside the alloys are determined by the relationship between the direction and level of sublattice magnetization of transition metal (TM) atoms, and those of heavy rare earth metal (RE) atoms inside the alloys. For example, the direction and level of TM sublattice magnetization are represented by a vector indicated by a dotted arrow those of RE sublattice magnetization are represented by a vector indicated by a solid arrow ↑, and the direction and level of magnetization of the entire alloy are represented by a vector indicated by a hollow arrow ↑. In this case, the hollow arrow ↑ (vector) is expressed as a sum of the dotted and solid arrows (vectors). However, in the alloy, the dotted and solid arrows (vectors) are directed in the opposite directions due to the mutual effect of the TM sublattice magnetization and the RE sublattice magnetization. Therefore, when strengths of these magnetizations are equal to each other, the sum of the dotted and solid arrows (vectors), i.e., the vector of the alloy is zero (i.e., the level of magnetization appearing outside the alloy becomes zero). The alloy composition making the vector of the alloy zero is called a compensation composition. When the alloy has another composition, it has a strength equal to a difference between the strengths of the two sublattice magnetizations, and has a hollow arrow (vector ↑ or ↓) having a direction equal to that of the larger vector. Thus, a magnetization vector of the alloy is expressed by illustrating dotted and solid vectors adjacent to each other, as shown in, e.g., FIG. 11. The RE and TM sublattice magnetization states of the alloy can be roughly classified into four states, as shown in FIGS. 12(1A) to 12(4A). Magnetization vectors (hollow arrow ↑ or ↓) of the alloy in the respective states are shown in FIGS. 12(1B) to 12(4B). For example, the alloy in the sublattice magnetization state shown in FIG. 12(1A) has a magnetization vector shown in FIG. 12(1B).

When one of the strengths of the RE and TM vectors is larger than the other, the alloy composition is referred to as "oo rich" named after the larger vector (e.g., RE rich).

Both the M and W layers can be classified into TM rich and RE rich compositions. Therefore, when the composition of the M layer is plotted along the ordinate and that of the W layer is plotted along the abscissa, the types of medium as a whole of the basic invention can be classified into four quadrants, as shown in FIG. 5. In FIG. 5, the intersection of the abscissa and the ordinate represents the compensation composition of the two layers.

The P type medium described above belongs to Quadrants I and III in FIG. 5, and the A type medium belongs to Quadrants II and IV.

In view of a change in coercivity against a change in temperature, a given alloy composition has characteristics wherein the coercivity temporarily increases infinitely and then abruptly decreases before a temperature reaches the Curie temperature (at which the coercivity is zero). The temperature corresponding to the infinite coercivity is called a compensation temperature ($T_{comp}$). At a temperature lower than the compensation temperature, the RE vector (solid arrow) is larger than the TM vector (dotted arrow) (i.e., TM rich), and vice versa at a temperature higher than the compensation temperature. Therefore, the compensation temperature of the alloy having the compensation composition is assumed to be present at the room temperature.

In contrast to this, no compensation temperature is present between the room temperature and the Curie temperature in the TM rich alloy composition. The compensation temperature below the room temperature is nonsense in the magnetooptical recording, and hence, it is assumed in this specification that the compensation temperature is present between the room temperature and the Curie temperature.

If the M and W layers are classified in view of the presence/absence of the compensation temperature, the medium can be classified into four types. A medium in Quadrant I includes all the four types of media. When both the M and W layers are classified in view of their RE or TM rich characteristics and in view of the presence/absence of the compensation temperature, recording media can be classified into the following nine classes.

TABLE 1

| Quadrant I (P type) | | | |
|---|---|---|---|
| Class | M layer: RE Rich | W layer: RE Rich | Type |
| 1 | $T_{comp.}$ | $T_{comp.}$ | 1 |
| 2 | No $T_{comp.}$ | $T_{comp.}$ | 2 |
| 3 | $T_{comp.}$ | No $T_{comp.}$ | 3 |
| 4 | No $T_{comp.}$ | No $T_{comp.}$ | 4 |

| Quadrant II (A type) | | | |
|---|---|---|---|
| Class | M layer: RE Rich | W layer: TM Rich | Type |
| 5 | $T_{comp.}$ | No $T_{comp.}$ | 3 |
| 6 | No $T_{comp.}$ | No $T_{comp.}$ | 4 |

| Quadrant III (P type) | | | |
|---|---|---|---|
| Class | M layer: TM Rich | W layer: TM Rich | Type |
| 7 | No $T_{comp.}$ | No $T_{comp.}$ | 4 |

| Quadrant IV (A type) | | | |
|---|---|---|---|
| Class | M layer: TM Rich | W layer: TM Rich | Type |
| 8 | No $T_{comp.}$ | $T_{comp.}$ | 2 |
| 9 | No $T_{comp.}$ | No $T_{comp.}$ | 4 |

In the above description, a two-layered film consisting of the M and W layers has been exemplified. An overwrite operation is enabled even in a medium including a multi-layered film consisting of three or more layers as long as the medium has the above-mentioned two-layered film. In particular, in the above description, the initial field Hini. is used as the external means. However, in the basic invention, any other external means may be employed. That is, the direction of magnetization of the W layer need only be aligned in a predetermined direction before a time immediately before recording.

For this reason, a structure using, as an external means, an exchange coupling force from an initializing layer in place of Hini. was invented (Japanese Journal "OPTRONICS", 1990, No. 4, pp. 227-231; International Application Laid-Open WO 90/02400 for further details). This invention will be referred to as an alternative invention hereinafter. The alternative invention will be described below.

[Description of Alternative Invention]

FIG. 13 shows a structure of a medium according to the alternative invention. This medium comprises a substrate and a magnetic film formed on the substrate. The magnetic film has a three- or four-layered structure constituted by sequentially stacking an M layer (first layer) consisting of a perpendicularly magnetizable magnetic thin film, a W layer (second layer) consisting of a perpendicularly magnetizable magnetic thin film, a "switching layer (third layer; referred to as a control layer in the above-mentioned journal "OPTRONICS") consisting of a perpendicularly magnetizable magnetic thin film", and formed if necessary, and an initializing layer (fourth layer) consisting of a perpendicularly magnetizable magnetic thin film. The first and second layers are exchange-coupled to each other, and the direction of magnetization of only the second layer can be aligned in a predetermined direction without changing the direction of magnetization of the first layer at a room temperature. In addition, the second and fourth layers are exchange-coupled to each other via the third layer at a temperature equal to or lower than a Curie temperature of the third layer.

The fourth layer has a highest Curie temperature, and does not lose its magnetization upon irradiation of a high-level laser beam. The fourth layer always holds magnetization in a predetermined direction, and serves as means for repetitively "initializing" the second layer (W layer) to prepare for the next recording every time recording is performed. For this reason, the fourth layer is called the initializing layer.

However, in a process of a high-temperature cycle (e.g., near $T_H$), the magnetization of the second layer must be reversed. In this case, the influence from the fourth layer must become negligibly small. When the temperature is increased, an exchange coupling force $\sigma_{w24}$ between the second and fourth layers can be conveniently decreased.

However, when sufficient $\sigma_{w24}$ remains even at $T_H$, the third layer is required between the second and fourth layers. If the third layer consists of a non-magnetic member, $\sigma_{w24}$ can be reduced to zero or can become very small. However, $\sigma_{w24}$ must be large enough to "initialize" the second layer at a certain temperature between $T_H$ and the room temperature. In this case, the third layer must apply an apparently sufficient exchange coupling force between the second and fourth layers. For this purpose, the third layer must consist of a magnetic member. Therefore, the third layer is converted to a magnetic member at a relatively low temperature to apply an apparently sufficient exchange coupling force $\sigma_{w24}$ between the second and fourth layers, and is converted to a non-magnetic member at a relatively high temperature to apply a zero or very small exchange coupling force $\sigma_{w24}$ between the second and fourth layers. For this reason, the third layer is called the switching layer (S layer).

The principle of a four-layered film overwrite operation will be described below with reference to FIG. 13. A typical example will be described below, but there are some examples in addition to this example. A hollow arrow indicates a direction of magnetization of each layer.

A condition before recording corresponds to either CONDITION 1 or CONDITION 2. Paying attention to an M layer 1, in CONDITION 1, an "A-directed" bit ($B_1$) is formed, or in CONDITION 2, a "non-A-directed" bit ($B_0$) is formed, a magnetic wall (indicated by a bold line) is present between the M layer and a W layer, and the medium is in a relatively unstable (metastable) state.

[Low-temperature Cycle]

A laser beam is irradiated on the bit in CONDITION 1 or 2 to increase a temperature. First, magnetization of an S layer disappears. For this reason, CONDITION 1 transits to CONDITION 3, or CONDITION 2 transits to CONDITION 4.

When the temperature is further increased, and reaches $T_{LS}$, the magnetization of the M layer is weakened, and the influence from the W layer via an exchange coupling force is strengthened. As a result, the direction of magnetization of the M layer in CONDITION 4 is reversed, and at the same time, the magnetic wall between the two layers disappears. This condition corresponds to CONDITION 5. The bit in CONDITION 3 originally has no magnetic wall between the two layers, and directly transits to CONDITION 5.

When irradiation of the laser beam is stopped or an irradiated portion is separated from the irradiation position, the temperature of the bit in CONDITION 5 begins to fall, and CONDITION 1 is then established via CONDITION 3.

This is the low-temperature cycle.

When the temperature is further increased from that in CONDITION 5, and exceeds the Curie temperature of the M layer, magnetization disappears, and CONDITION 6 is established. When irradiation of the laser beam is stopped or an irradiated portion is separated from the irradiation position, the temperature of the bit in CONDITION 6 begins to fall, and then reaches a temperature slightly lower than the Curie temperature of the M layer. Thus, magnetization appears in the M layer. In this case, the direction of magnetization of the M layer is influenced by the W layer via the exchange coupling force, and is aligned in a stable direction with respect to the direction of magnetization of the W layer (i.e., in a direction not to form a magnetic wall between the layers). Since the medium is of P type, CONDITION 5 is reproduced. The temperature is further decreased, and CONDITION 3 is established accordingly. Thereafter, a bit in CONDITION 1 is formed. This process is another example of the low-temperature cycle.

[High-temperature Cycle]

When a laser beam is irradiated on the bit in CONDITION 1 or 2 to increase a temperature, CONDITION 6 is established via CONDITION 5, as described above.

When the temperature is further increased, the coercivity of the W layer is decreased considerably. For this reason, the direction of magnetization of the W layer is reversed by a bias field Hb ↓. This is CONDITION 8.

When irradiation of the laser beam is stopped or an irradiated portion is separated from the irradiation position, the medium temperature begins to fall. The medium temperature then reaches a temperature slightly lower than the Curie temperature of the M layer. Thus, magnetization appears in the M layer. The direction of magnetization of the M layer is influenced by the W layer via the exchange coupling force, and is aligned in a stable direction with respect to the direction of magnetization of the W layer (i.e., in a direction not to form a magnetic wall between the layers). Since the medium is of P type, CONDITION 9 appears.

When the temperature is further decreased, magnetization appears in the S layer. As a result, the W layer and an I layer are magnetically coupled (by the exchange coupling force). As a result, the direction of magnetization of the W layer is aligned in a stable direction with respect to the direction of magnetization of the I layer (i.e., in a direction not to form a magnetic wall between the layers). Since the medium is of P type, the direction of magnetization of the W layer is reversed to the "A direction", and as a result, an interface wall is formed between the M and W layers. This condition is maintained at the room temperature, and a bit in CONDITION 2 is formed.

This is the high-temperature cycle.

When the temperature is further increased after CONDITION 8 appears by the bias field Hb ↓, the temperature then exceeds the Curie temperature of the W layer. As a result, CONDITION 7 appears.

When radiation of the laser beam is stopped or an irradiated portion is separated from the irradiation position, the medium temperature begins to fall. The medium temperature then reaches a temperature slightly lower than the Curie temperature of the W layer. Thus, magnetization appears in the W layer. The direction of magnetization of the W layer follows the direction of the bias field Hb ↓. As a result, CONDITION 8 appears.

When the temperature is further decreased, a bit in CONDITION 2 is formed via CONDITION 9. This process is another example of the high-temperature cycle.

As described above, a bit in CONDITION 1 is formed in the low-temperature cycle, and a bit in CONDITION 2 is formed in the high-temperature cycle independently of a previous recording state. Therefore, an overwrite operation is enabled.

[Problems to be Solved by the Invention]

The present inventor manufactured samples of an "overwrite-capable magnetooptical recording medium of a three- or four-layered structure having an initializing layer" according to the alternative invention described above, and examined their characteristics, especially, an allowable range (margin) of high level $P_H$.

Every time an overwrite operation was performed while gradually changing the margin of $P_H$, the C/N ratio was measured by reproducing information. As shown in FIG. 2, the C/N ratio is decreased at levels other than predetermined $P_H$. The C/N ratio is preferably as high as possible, and a range in which the C/N ratio is not decreased is determined as the $P_H$ margin.

However, an additionally manufactured medium sample had a narrow $P_H$ margin, and this medium sample was unsatisfactory in a practical application. A problem to be solved by the present invention is the narrow $P_H$ margin.

The narrow $P_H$ margin causes the following secondary problems. ① The setting precision of the intensity level of a semiconductor laser normally used as a light source is about ±10%, individual lasers suffer from a variation of about ±10% upon manufacture, and the setting precision drifts by about ±10% as time elapses. ② The setting precision drifts by about ±10% due to aging, or a change in environmental condition. ③ The intensity of a laser beam which reaches the medium via an optical system drifts by about ±10% as time elapses under the influence of dust, and the like. ④ Individual optical systems suffer from a variation of about ±10% upon manufacture, and the intensity of a laser beam which reaches the medium is varied by about ±10%. ⑤ Due to these variations or drifts, if the $P_H$ margin is narrow, the yield of recording apparatuses is decreased, and information is recorded at an intensity exceeding the $P_H$ margin, resulting in a decrease in C/N ratio.

SUMMARY OF THE INVENTION

It is an object of the present invention to enlarge a $P_S$ margin.

The present inventors has made extensive studies, and fortunately found that the $P_H$ margin could be enlarged by forming a thermal diffusion layer, e.g., a Cu layer, adjacent to a fourth layer (I layer) directly or via a protective layer, thus achieving the present invention.

According to the present invention, there is provided an overwrite-capable magnetooptical recording medium comprising a first layer consisting of perpendicularly magnetizable magnetic film functioning as a memory layer, a second layer consisting of perpendicularly magnetizable magnetic film functioning as a writing layer, a third layer formed if necessary, and consisting of perpendicularly magnetizable magnetic film functioning as a switching layer, a fourth layer consisting of perpendicularly magnetizable magnetic film functioning as an initializing layer, the first to fourth layers being sequentially stacked, and a thermal diffusion layer adjacent to the fourth layer, wherein the first and second layers are exchange-coupled, a direction of magnetization of only the second layer can be aligned in a predetermined direction without changing a direction of magnetization of the first layer at a room temperature, and the second and fourth layers are exchange-coupled at a temperature equal to or lower than a Curie temperature of the third layer (or at a temperature near the room temperature if the medium has no third layer).

As the thermal diffusion layer, a material having a high thermal conductivity, e.g., a non-magnetic metal such as Cu, Al, Au, Ag, or the like, is used.

The thermal diffusion layer preferably has a thickness of 1,000 Å or less.

A protective layer consisting of a dielectric having a thickness of 1,000 Å or less may be formed between the thermal diffusion layer and the fourth layer in order to prevent the fourth layer from being corroded. As the dielectric, a material having a high thermal conductivity as much as possible, e.g., silicon nitride, aluminum nitride, titanium nitride, chromium nitride, or the like, is preferably used.

As described above, according to the present invention, the thermal diffusion layer is formed in an overwrite-capable magnetooptical recording medium having an initializing layer first, whereby the margin of the laser beam intensity at high level $P_H$ for executing the high-temperature cycle can be enlarged. For this reason, the above-mentioned secondary problems can be eliminated.

BRIEF DESCRIPTION OF THE DRAWINGS

FIG. 5 is a map showing types of media classified into four quadrants;

FIG. 6 is a graph showing the relationship between a coercivity and a temperature of first and second layers of an overwrite-capable magnetooptical recording medium;

FIG. 7 is a schematic view showing directions of magnetization of the first and second layers;

FIG. 8 is a diagram showing changes in direction of magnetization of tne first and second layers;

FIG. 10 is a diagram showing changes in direction of magnetization of the first and second layers;

FIG. 11 is an explanatory view for comparing a vector (solid arrow) representing a sublattice magnetization of a rare-earth (RE) atom, and a vector (dotted arrow) representing a sublattice magnetization of a transition-metal (TM) atom;

FIGS. 12(1A) to (4B) are explanatory views showing the relationship between the sublattice magnetization vectors and an arrow ↑ indicating the direction of magnetization of an alloy.

DETAILED DESCRIPTION OF THE PREFERRED EMBODIMENT

The present invention will be described in detail below by way of its example. However, the present invention is not limited to this.

Figure 1:
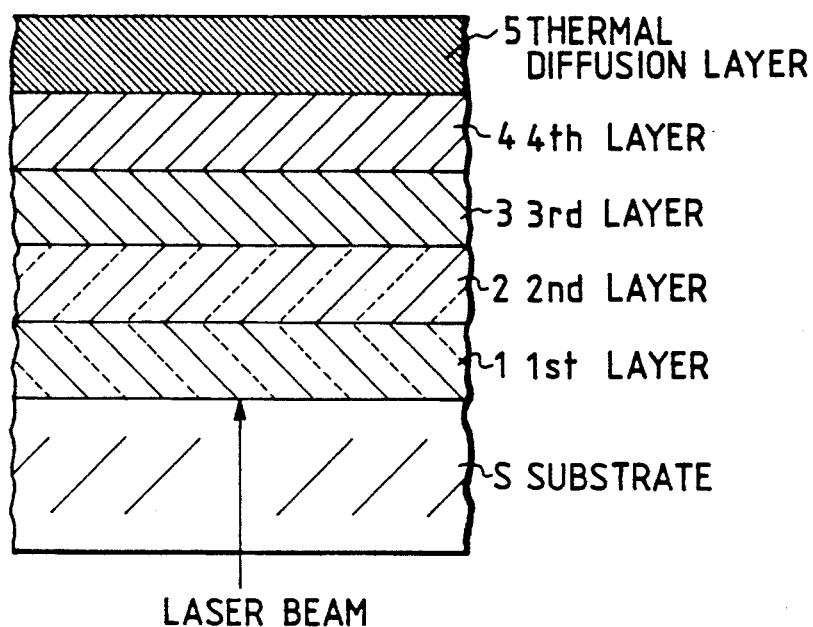
FIG. 1 is a schematic longitudinal sectional view of an overwrite-capable magnetooptical recording medium according to the present invention.

Using an RF magnetron sputtering apparatus, a 400-Å thick $Tb_{22}Fe_{73}Co_5$ first layer (M layer), an 800-Å thick $Dy_{28}Fe_{40}Co_{32}$ second layer (W layer), a 200-Å thick $Tb_{23}Fe_{76}Co_1$ third layer (S layer), and a 400-Å thick $Tb_{29}Co_{71}$ fourth layer (I layer) were sequentially stacked on a glass substrate having a diameter of 200 mm. Thereafter, a 500-Å thick aluminum layer as a thermal diffusion layer 5 was stacked on the resultant structure while maintaining a vacuum state, thus manufacturing an overwrite-capable magnetooptical recording medium of this Example. FIG. 1 illustrates this medium.

[Comparative Example]

An overwrite-capable magnetooptical recording medium was manufactured following substantially the same procedures as in the above Example except that no thermal diffusion layer was formed.

[Evaluation Test]

An external field of 10 kOe was applied to the medium of the Example, and the medium of the Comparative Example, thereby aligning the direction of magnetization of the fourth layer (I layer) in an "A direction".

Each medium was rotated at a linear velocity of 10 m/sec, and a laser beam was irradiated on a portion the medium while applying an "A-directed" bias field Hb = 300 Oe to the medium, thereby overwrite-recording reference information. In this case, the laser beam intensity was set to have high level $P_H$=values described along the abscissa in FIG. 2 (unit: mW=on disk), and low level $P_L$=5.0 mW, and the laser beam was pulse-modulated between these levels at a frequency of 1 MHz (reference information). As a precaution, the overwrite recording was repeated three times.

Thereafter, reproduction was performed using a laser beam of a reproduction intensity $P_R$=1.0 mW (on disk), and the C/N ratio was measured.

Figure 2:
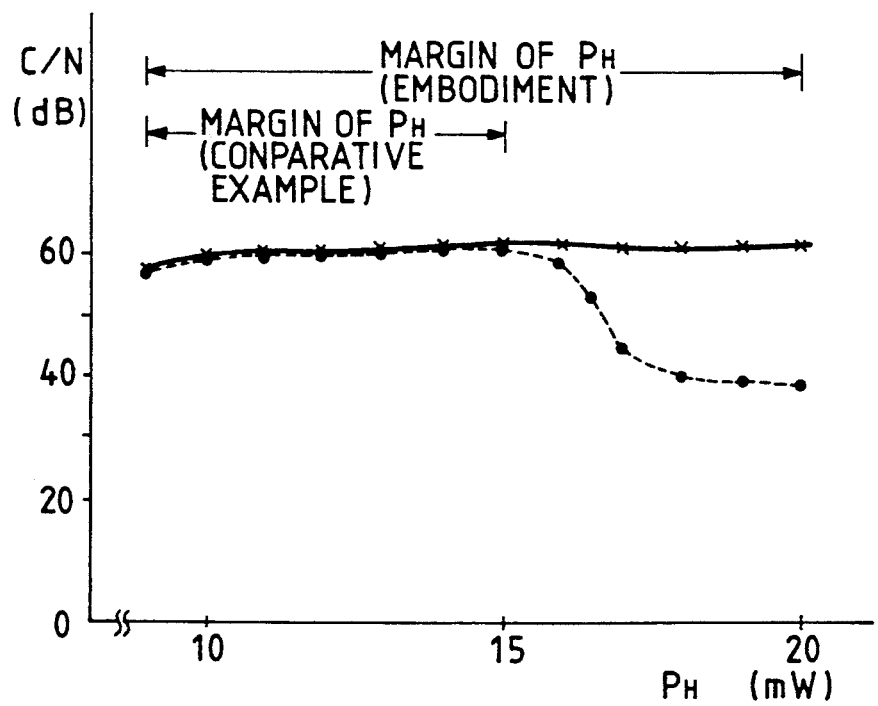
FIG. 2 is a graph showing C/N ratios of a medium of this Example, and a medium of the Comparative Example having no thermal diffusion layer obtained when information overwritten while changing $P_H$ is reproduced, wherein a solid curve represents characteristics of the medium of this Example, a dotted curve represents those of the Comparative Example, and a $P_H$ margin is also illustrated.
Figure 3A:
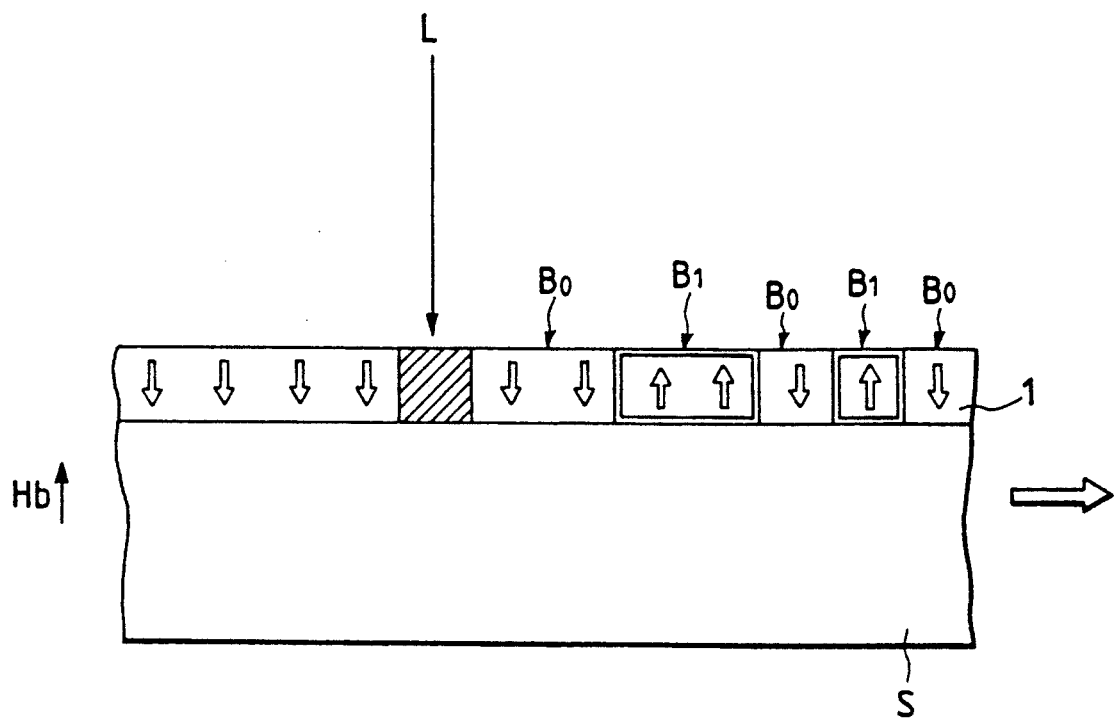
FIG. 3A is a schematic view for explaining the principle of recording of a magnetooptical recording method.
Figure 3B:
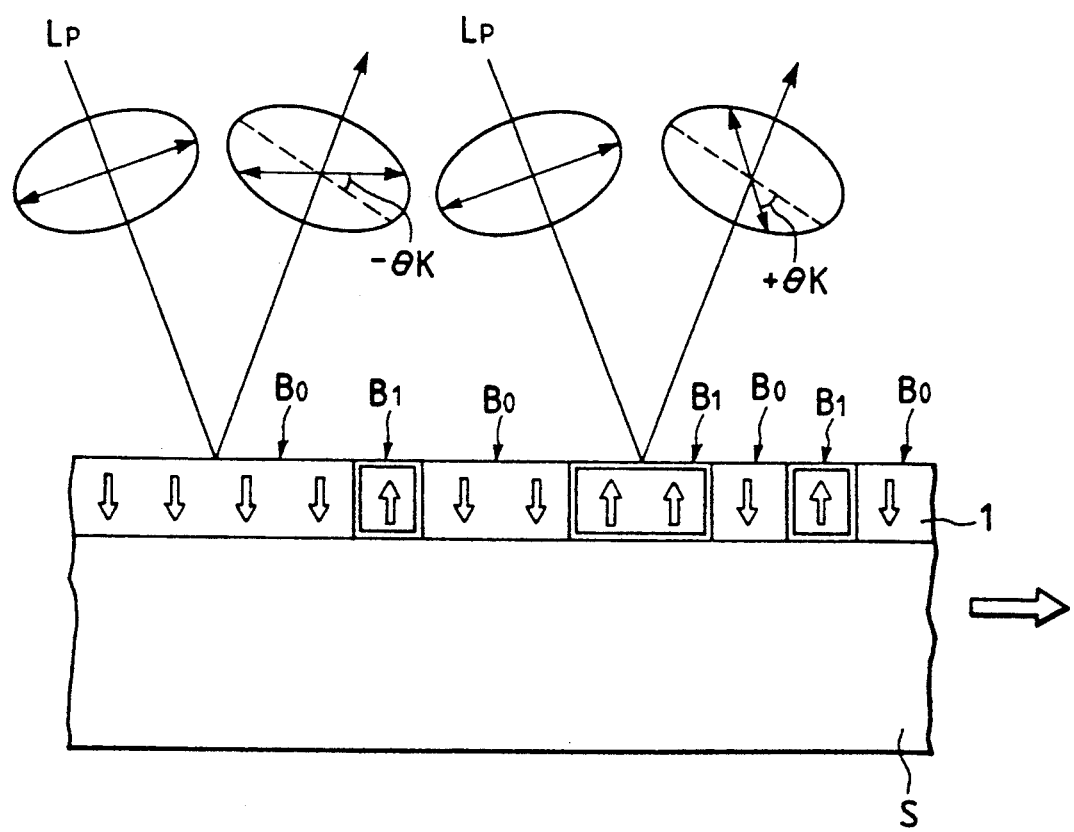
FIG. 3B is a schematic view for explaining the principle of reproduction of the magnetooptical recording method.
Figure 4A:
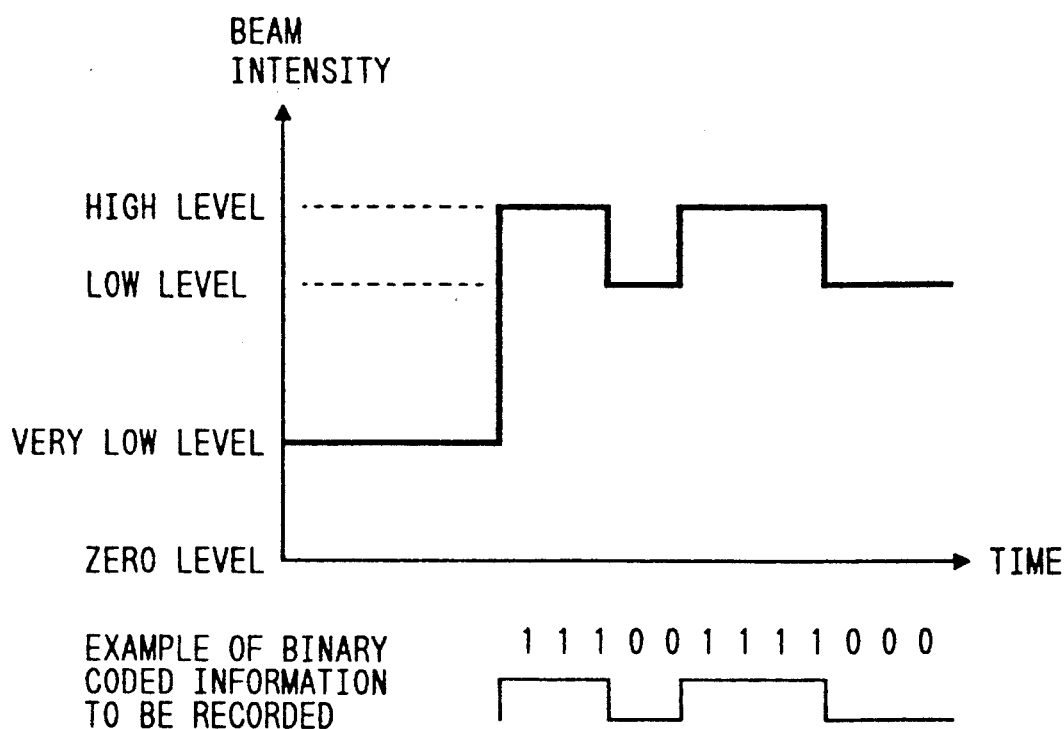
FIG. 4A is a waveform chart of a laser beam when an overwrite operation is performed according to the basic invention.
Figure 4B:
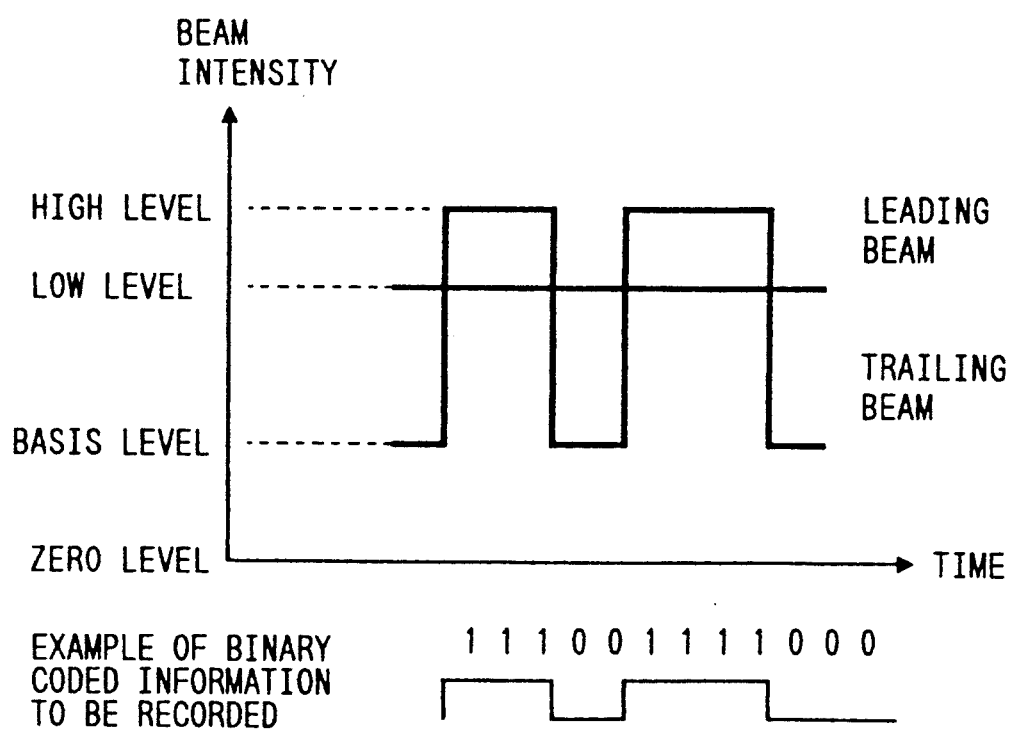
FIG. 4B is a waveform chart of a laser beam when an overwrite operation is performed using two beams according to the basic invention.
Figure 9A:
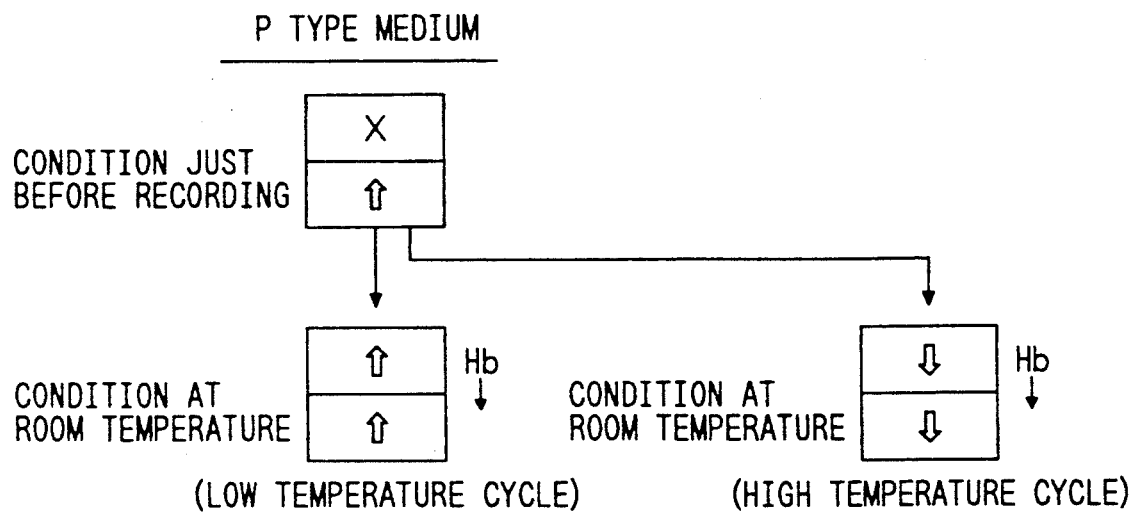
FIGS. 9A and 9B are respectively diagrams showing changes in direction of magnetization of the first and second layers of P and A type media after the low- and high-temperature cycles, and show conditions at a room temperature.
Figure 9B:
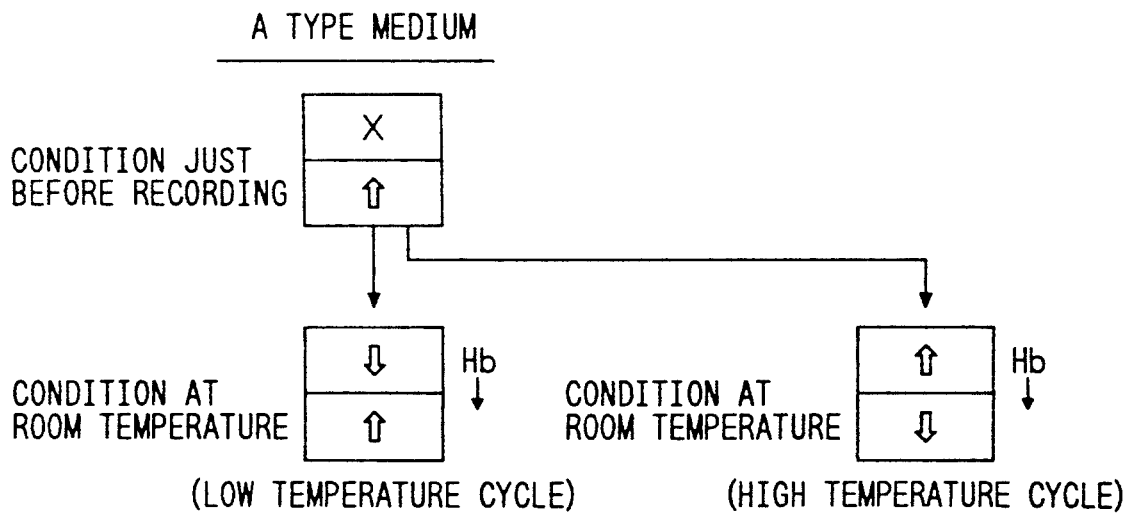
Figure 13:
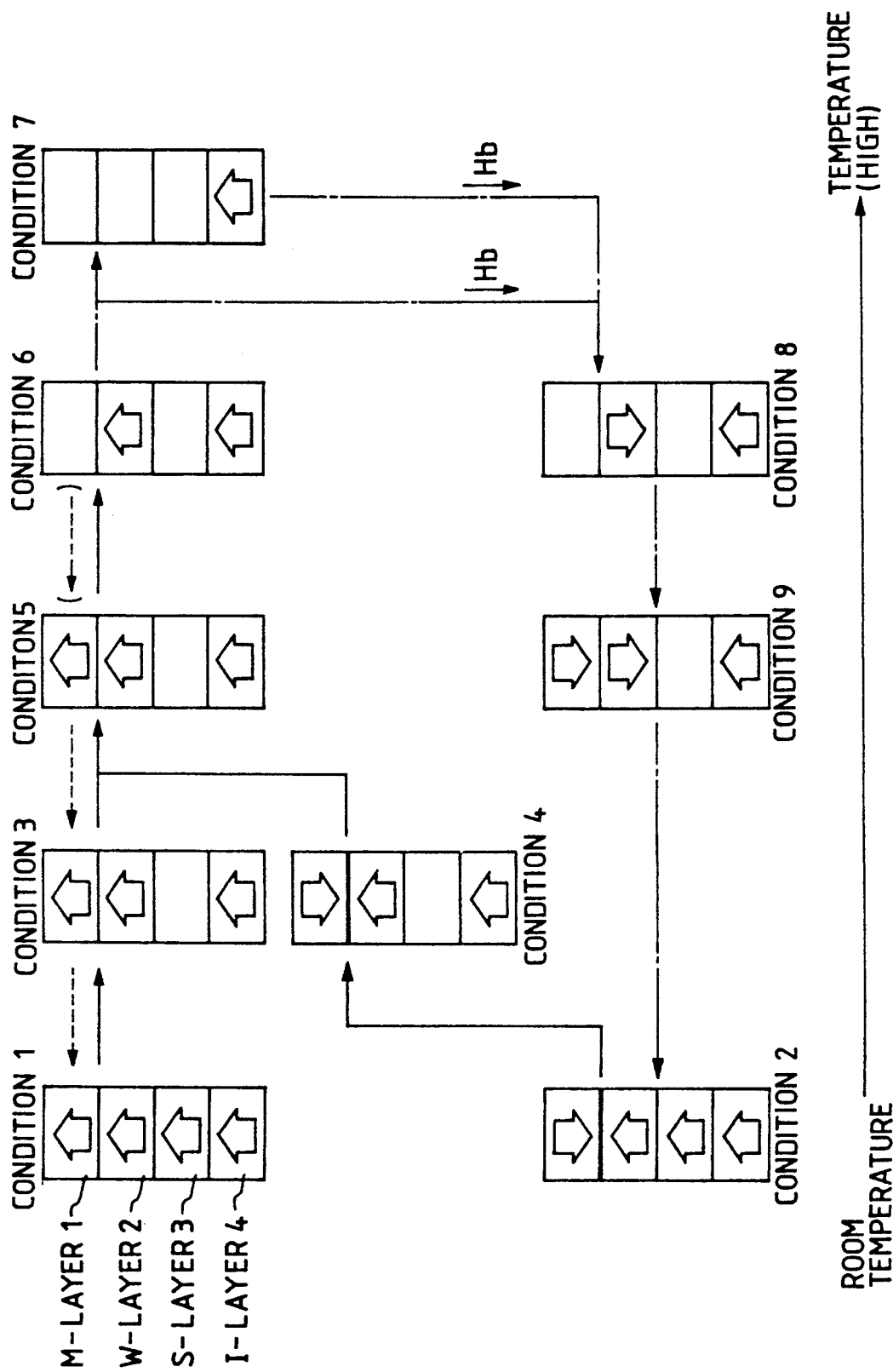
FIG. 13 is a diagram for explaining changes in direction of magnetization of respective layers of a typical medium of the present invention in accordance with a change in temperature.

The above-mentioned test was repeated by changing $P_H$ between 8 to 20 mW at 1-mW intervals, and a change in C/N ratio was obtained. FIG. 2 shows this result. The graph of a solid curve represents the medium of this Example, and the graph of a dotted curve represents the medium of the Comparative Example.

As can be seen from FIG. 2, in the medium of the Comparative Example, when $P_H$ exceeds 15 mW, the overwrite operation cannot be satisfactorily performed, and the noise level is increased. It is presumed that the cause for this phenomenon lies in the disturbed direction of magnetization of the fourth layer after several overwrite operations.

In contrast to this, in this Example, no decrease in C/N ratio is observed up to at least 20 mW.

As a result, in this Example, the $P_H$ margin is as wide as at least 8 to 20 mW=12 mW, while that of the Comparative Example is as narrow as 8 to 15 mW=7 mW.

What is claimed is:

1. An overwrite-capable magneto-optical recording medium comprising:
    a first layer consisting of perpendicularly magnetizable magnetic film functioning as a memory layer;
    a second layer consisting of perpendicularly magnetizable magnetic film functioning as a writing layer;
    a third layer consisting of perpendicularly magnetizable magnetic film functioning as a switching layer;
    a fourth layer consisting of perpendicularly magnetizable magnetic film functioning as an initializating layer, said first to fourth layers being sequentially stacked; and
    a thermal diffusion layer adjacent to said fourth layer, said thermal diffusion layer being made of nonmagnetic metal,
    wherein said first and second layers are exchangecoupled, a direction of magnetization of only said second layer is aligned in a predetermined direction without changing a direction of magnetization of said first layer at a room temperature, and said second layer and said fourth layer are exchange-coupled through said third layer at a temperature equal to or less than a Curie temperature of said third layer.

2. A recording medium according to claim 1, further comprising a protective layer intervening between said fourth layer and said thermal diffusion layer.

3. A recording medium according to claim 2, wherein said protective layer consists of dielectric less than 1,000 Å thick.

4. A recording medium according to claim 1, wherein said thermal diffusion layer is less than 1,000 Å thick.

5. A recording medium according to claim 4, wherein said nonmagnetic metal is a member selected from the group consisting of Cu, Au, Ag, and Al.

6. An over-write-capable magneto-optical recording medium comprising:
    a memory layer consisting of perpendicularly magnetizable magnetic film;
    a writing layer consisting of perpendicularly magnetizable magnetic film;
    an initializing layer consisting of perpendicularly magnetizable magnetic film, said memory layer, said writing layer, and said initializing layer being sequentially stacked; and
    a thermal diffusion layer adjacent to said initializing layer, said thermal diffusion layer being made of nonmagnetic metal,
    wherein said memory layer and said writing layer are exchanged-coupled, a direction of magnetization of only said writing layer is aligned in a predetermined direction without changing a direction of magnetization of said memory layer at a room temperature, and said writing layer and said initializing layer are exchange-coupled at a temperature near the room temperature.

7. A recording medium according to claim 6, further comprising a protective layer intervening between said initializing layer and said thermal diffusion layer.

8. A recording medium according to claim 7, wherein said protective layer consists of dielectric less than 1,000 Å thick.

9. A recording medium according to claim 6, wherein said thermal diffusion layer is less than 1,000 Å thick.

10. A recording medium according to claim 9, wherein said nonmagnetic metal is a member selected from the group consisting of Cu, Au, Ag, and Al.

* * * * *